(12) United States Patent
Kempter et al.

(10) Patent No.: US 11,134,699 B2
(45) Date of Patent: Oct. 5, 2021

(54) FILLED CHEESE PRODUCT

(71) Applicant: Intercontinental Great Brands LLC, East Hanover, NJ (US)

(72) Inventors: Klaus Kempter, Munich (DE); Uwe Marder, Munich (DE)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 484 days.

(21) Appl. No.: 14/851,655

(22) Filed: Sep. 11, 2015

(65) Prior Publication Data

US 2016/0100601 A1 Apr. 14, 2016

(30) Foreign Application Priority Data

Oct. 13, 2014 (GB) ..................................... 1418075

(51) Int. Cl.
*A23C 19/076* (2006.01)
*A23C 19/09* (2006.01)

(52) U.S. Cl.
CPC ........ *A23C 19/076* (2013.01); *A23C 19/0765* (2013.01); *A23C 19/0908* (2013.01); *A23C 2250/10* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,324,804 A | * | 4/1982 | Davis .................. | A23C 19/062 426/36 |
| 5,194,283 A | | 3/1993 | Dupas et al. | |
| 5,882,704 A | * | 3/1999 | Yamaguchi .......... | A23C 19/055 426/34 |
| 6,551,637 B1 | | 4/2003 | Fontenille | |
| 2001/0019732 A1 | | 9/2001 | Roussel et al. | |
| 2003/0129281 A1 | | 7/2003 | Murray et al. | |
| 2012/0141633 A1 | * | 6/2012 | Marder ................ | A23C 19/084 426/89 |

FOREIGN PATENT DOCUMENTS

| | | |
|---|---|---|
| DE | 3708839 A1 | 10/1987 |
| DE | 10121813 A1 | 11/2001 |
| EP | 1020120 A2 | 7/2000 |
| EP | 1520481 A1 | 4/2005 |
| EP | 2225951 A1 | 8/2010 |
| EP | 2238838 A1 | 10/2010 |
| EP | 2269466 A2 | 5/2011 |
| GB | 2319457 | 5/1998 |
| JP | 3091221 B2 | 9/2000 |

(Continued)

OTHER PUBLICATIONS

CCC: Coupon Clipping Cook: Breakfast Biscuit Sandwich published online on Jun. 4, 2011 at: http://www.couponclippingcook.com/breakfast-biscuit-sandwich/.*

(Continued)

*Primary Examiner* — Patricia A George
(74) *Attorney, Agent, or Firm* — Cantor Colburn LLP

(57) ABSTRACT

The present invention relates to an individually packaged cream-cheese laminate including first and second outer cream-cheese layers and a filling layer interposed between the first and the second outer cream-cheese layers.

12 Claims, 4 Drawing Sheets

(56) References Cited

FOREIGN PATENT DOCUMENTS

| WO | 9603860 | 2/1996 |
| --- | --- | --- |
| WO | 2013052223 A1 | 4/2013 |

OTHER PUBLICATIONS

Land of Lakes: Land O Lakes Co—Jack Colby Jack Natural Cheese, 3/4 oz, 10 count; published online at least by Jan. 5, 2014 as shown in the first review, at: https://www.walmart.com/ip/Land-O-Lakes-Snack-N-Cheese-To-Go-Co-Jack-Cheese-10ct/10291069.*
H10: Mahdah; Method and Apparatus for Manufacturing Sheet of Processed Processed Processed Cheese, and Separately of Processed Processes; JP,2012-519491 ,A; Kraft; published: Aug. 30, 2012.*
CJC: Crest Japan Company: Utility model registration No. 3091221 (U 3091221); Publication date: Jan. 24, 2003.*
HM: Hundred Machinery Enterprise Co.: Encrusting/Extrusion Machine; published online at least by Mar. 11, 2006 at: https://web.archive.org/web/20060311223707/http://www.hmfoodmachinery.com/09-kn200.html.*
Del Toro Estrada E : MX 2001012697 A1; Composition and procedure are for making cream cheese in sliced portions individually enclosed in aseptic sealed packets; published Jun. 1, 2003. (Year: 2003).*
Waigel: WO2012038513A1; Method for producing a foodstuff containing an ingredient of milk origin and having a closed surface; published Mar. 29, 2012. (Year: 2012).*
Japan Office Action for Japanese Patent Application No. 2015-179353; OA Transmission dated Jun. 6, 2016; 2 pages; English Translation.
Japan Office Action for Japanese Patent Application No. 2015-179353; OA Transmission dated Jun. 6, 2016; 3 pages; Non-English Translation.
Great Britain Examination Report for GB Application No. 1418075.6; International Filing Date Oct. 13, 2014; dated Mar. 19, 2015; 3 pages.
Great Britain Search Report for GB Application No. 1418075.6; International Filing Date Oct. 13, 2014; dated Mar. 18, 2015; 1 page.
Ads of the World; "New cream cheese in slices"; Borden Cream Cheese Spread; Sep. 12, 2013; 2 pages; retrieved from http://adsoftheworld.com/media/print/borden_slice.
Canadian Dairy Commission; "Cream Cheese"; MILKingredients.co; Oct. 17, 2011; 3 pages; retrieved from http://www.milkingredients.ca/index-eng.php?id=177.
New Zealand Office Action for New Zealand Patent Application No. 712556, OA dated Dec. 18, 2015, 4 pages.

* cited by examiner

FILLED CHEESE PRODUCT

CROSS-REFERENCE TO RELATED APPLICATIONS

This application claims priority under 35 U.S.C. § 119 (a) from Great Britain Application No. 1418075.6 filed on Oct. 13, 2014, the disclosure of which is incorporated herein in its entirety by reference.

TECHNICAL FIELD

The present disclosure relates to a cheese product having a filling and a method for the production thereof. In particular, the disclosure relates to a cream-cheese slice containing a filling.

BACKGROUND

Individually packaged sheets or slices of processed cheese are well-known as foodstuffs used as toppings and fillings for sandwiches, toast, baked potatoes and such like. Such cheese slices, which are usually rectangular and flat pieces of processed cheese, are typically homogeneous. However, there is an increasing desire to provide consumers with food products that present novel combinations of tastes and textures. This goal has led to the development of slices of processed cheese that contain a filling. The filling may constitute a variety of foodstuffs, such as tomato sauce, mustard, or even a different type of cheese.

WO 2010/102159 describes a method for the manufacture of a filled slice of processed cheese, in which processed cheese and filling are co-extruded into packaging material. The process involves supplying the processed cheese in a molten state, typically at a temperature of 70° C. or above. This document stresses the importance of using a meltable cheese so that it does not stick to the extrusion apparatus at such a temperature, thus explaining the desirability of processed cheese in this context.

Nevertheless, there remains a prejudice amongst the public towards processed cheese products. Processed cheese is perceived as being unhealthy and unnatural, and indeed is often described as "plastic cheese" owing to its texture. Processed cheese is also considered to lack the taste of traditional cheeses. US2003/129281 discloses a method involving co-extruding a cheese phase and a second edible phase to form the nutritionally superior cheese product. None of the Examples employ a cream cheese. Furthermore, since the method involves continuous coextrusion, the filling is not entirely enclosed as a result of a cutting step to form the final products. The extrusion is conducted with a viscous cheese at a cool ambient temperature.

EP2238838 discloses a food having multiple textures obtained by depositing a frozen food material on a layer of food material. The filling may be a frozen, aerated, shaped dairy product such as cream cheese, provided with a distinct shell material.

DE10121813 discloses a layered product comprising fresh cheese layers with enclosed chocolate pieces or cacao coloured layer.

DE3708839 discloses a bulk layered cheese product provided as layers filled into a packaging tray.

U.S. Pat. No. 5,194,283 discloses a co-extruded cheese composite from two different unripened drained cheese curds.

Accordingly, it is desirable to provide an alternative cheese slice product and/or tackle at least some of the problems associated with the prior art or, at least, to provide a commercially useful alternative thereto.

SUMMARY

In a first aspect the present disclosure provides an individually packaged cream-cheese laminate comprising first and second outer cream-cheese layers and a filling layer interposed therebetween.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

The present disclosure provides an individually packaged cream-cheese laminate comprising first and second outer cream-cheese layers and a filling layer interposed therebetween. Cream-cheese is an acidic, cultured or direct acidified, uncured cheese made of dairy components including a fat source, preferably a mixture of cream and milk. Cream-cheese is a well-known material. It is a soft, mild-tasting cheese, often with a high fat content. Cream-cheese is not naturally matured and is meant to be consumed fresh, unlike other soft cheeses. Cream-cheese is often spread on bread, bagels, crackers, etc., and used as a dip for potato chips and similar snack items, and in salads.

The present inventors have realised that there is potential for a new cheese product having a hitherto unknown combination of flavour and texture. In particular, the product described herein provides the cultured note flavour associated with cream-cheeses as the outer layers of a filled cheese slice, thus departing from the bland taste associated with the processed cheese slices of the prior art. It is suitable for use as a culinary adjunct (e.g. as a topping or filling for sandwiches or hot products such as baked potatoes) or as a standalone snack.

Cream-cheese is generally soft and sticky and lacks the elasticity of a processed cheese slice. Furthermore, upon heating to the elevated temperatures (over 70° C.) used in typical cheese slice manufacturing processes, cream-cheese becomes mealy. Owing to the high spreadability of cream-cheese relative to other cheeses, it would be expected that cream-cheese would stick to the co-extrusion apparatus used in the manufacture of filled cheese slices, and that other cheeses with greater processability would be more suitable as outer layers. Nevertheless, the present inventors have found that increasing the protein content of the cream-cheese and including certain additives enables the cream-cheese to be co-extruded with a filling. Surprisingly, it has been found that such cream-cheese remains firm for prolonged periods at the high temperatures required in the manufacturing process. The product is not sticky and can readily be peeled from the thin sheets which form the packaging.

By laminate it is meant a composite structure made up of multiple layers, which in the present disclosure constitute the first and second outer cream-cheese layers and the filling layer. The filling layer is interposed, or placed, between the first and second outer cream-cheese layers. Preferably, the filling layer is fully enclosed by the first and second outer cream-cheese layers. In other words, the filling layer is preferably surrounded or closed off on all sides, i.e. is enveloped by, the first and second outer cream-cheese layers. This helps to provide a surprise element to the product, since the filling is not visible to the consumer from the outside. In one embodiment, the first and second cream-cheese layers are merged to form a single layer around the periphery of the laminate. In this embodiment, the thickness of said single layer may preferably be less than the thickness of a middle of the laminate.

The cream-cheese laminate as disclosed herein is individually packaged. By way of example, the first and/or second outer cream-cheese layers may be covered with thin, transparent plastic film. The present inventors have found that it is possible to produce a filled cream-cheese laminate that does not stick to the packaging film. This is surprising given the spreadability and stickiness that is typically associated with cream-cheese.

The first and second outer cream-cheese layers may have the same appearance (pale white or cream) and/or flavour (characteristic cultured) as currently commercially available cream-cheese. They must, however, be firm enough to remain intact and not adhere to the packaging.

The filling layer is different to the first and second outer cream-cheese layers. By "different" it is meant that the filling layer has a different chemical composition to the first and second outer cream-cheese layers. As such, the filling layer may comprise a second cream-cheese or any other type of cheese. In this embodiment, the cheese that forms part of the filling layer preferably has a different fat content and/or protein content to the cream-cheese in the outer layers. This serves to provide a texture contrast in the filled product. The cheese that forms part of the filling layer preferably has a similar solids content to, or the same solids content as, the cream-cheese in the outer layers. This prevents excessive water migration between the layers.

Since the filling is shielded from the hot surfaces of the co-extrusion apparatus by the outer layers, fillings can be chosen that are more sensitive to temperature than the outer cream-cheese. As such, conventional cream cheese may be used as the filling as it is not exposed to high temperatures and therefore does not become mealy. A wide variety of fillings can be selected to provide a product that presents contrasting tastes, textures and/or colours to the consumer. Preferably, the filling layer comprises a second cream-cheese, processed cheese, pesto, tomato sauce, salad cream, mayonnaise, mustard, marmalade, jam, jelly, chocolate, Marmite®, or a mixture of two or more thereof.

Preferably, the cream-cheese comprises one or more stabilisers selected from the group consisting of gelatine, xanthan gum, carrageenan, locust bean gum, citrate and mixtures of two or more thereof. Citrate is a well-known stabiliser and may be added in the form of an alkali metal salt, such as trisodium citrate.

Preferably, the stabilisers are present in an amount of from 1 to 5 wt %, more preferably from 2 to 4 wt %, and still more preferably from 2.5 to 3.5 wt % based on the weight of the cream-cheese. This may involve a citrate level of from 0.1 to 2 wt %, preferably from 0.2 to 0.8 wt %, the remainder being one or more hydrocolloids (gelatine, xanthan gum, carrageenan and/or locust bean gum). These higher than conventional levels of stabiliser help to provide the firmer texture which has surprisingly been found to permit cream-cheese co-extrusion at the requisite high temperatures. Preferably the stabilisers comprise citrate and Gelatine and optionally one or more selected from xanthan gum, carrageenan and/or locust bean gum. As will be appreciated, further ingredients, such as salt and the like, can also be included in the cream-cheese formulation.

Preferably, the cream-cheese has a solids content of from 35 to 60 wt %, more preferably from 40 to 55 wt %, and still more preferably from 44 to 50 wt % based on the weight of the cream-cheese. In these embodiments, 65 to 40 wt %, 60 to 45 wt % or 56 to 50 wt % respectively of the cream-cheese is comprised of liquid, which is water or mainly water. The solids content includes protein, fat, sugars (lactose), added stabilisers and the like.

Alternatively or in addition, the cream-cheese may have a protein content of from 6 to 20 wt %, preferably from 10 to 18 wt %, more preferably from 10 to 15 wt % based on the weight of the cream-cheese. Some of the protein content is derived from added milk protein concentrate (such as whey protein concentrate and/or one or more caseinate salts) and some is derived from the milk/cream that is used to form the cream-cheese curds. The preparation of cream-cheese curds is known in the art and is described in more detail below. The protein content of the cream-cheese forms part of its solids content. The present inventors have found that increasing the protein content of the cream-cheese relative to conventional cream-cheeses, by adding milk protein concentrate during the manufacture of the cream-cheese, enables a firm texture to be obtained without the stickiness usually associated with cream-cheese.

Preferably, the cream-cheese has a casein content of from 7 to 10 wt %, more preferably from 8 to 9 wt % based on the weight of the cream-cheese. By contrast, conventional cream-cheese usually contains casein at levels of 6 wt % or below.

Where the cream-cheese has a fat content of at least 20 wt %, preferably at least 24 wt %, the protein content is preferably at least 6 wt %, more preferably from 7 to 10 wt %, and most preferably from 10 to 11 wt %. Where the cream-cheese has a fat content of from 8 to 18 wt %, preferably from 10 to 15 wt %, the protein content is preferably at least 8 wt %, more preferably at least 10 wt %, and most preferably from 10 to 12 wt %.

The cream-cheese may further comprise one or more flavouring ingredients, such as pastes or powders or inclusions of actual food components. For example, tomato paste or pieces, herbs, chocolate pieces and the like. The preferred ranges of solids and protein described above do not take into account any inclusions added to the cream-cheese.

Despite containing a filling, the cream-cheese laminate of the present disclosure may be dimensionally similar to, or thinner than, a conventional processed cheese slice. As such, a middle of the laminate (i.e. a midpoint across the surface of the laminate) preferably has a thickness of 6 mm or less, more preferably 5 mm or less, still more preferably 4 mm or less, and preferably at least 2 mm. As explained above, the laminate may have a greater thickness at a middle than at the periphery. Preferably, the filling layer is of a constant thickness, preferably wherein said thickness is 4 mm or less, more preferably 3 mm or less, still more preferably 2 mm or less, and preferably at least 1 mm. Alternatively or in addition, the cream-cheese laminate may have a mass of 45 g or less, preferably 40 g or less, and preferably at least 25 g. With these dimensions, the filled cream-cheese laminates do not give the impression of a "doubled" slice of cheese with a filling in between. Rather, the filled laminates of cream-cheese have, at the most, the thickness and/or weight of two conventional slices of processed cheese. The laminates may further be substantially square in shape and have a length and/or width of from 5 cm to 10 cm, preferably from 8 cm to 10 cm.

Preferably, the cream-cheese laminate consists of the first and second outer cream-cheese layer and the filling layer.

The present disclosure further provides a package comprising the individually packaged cream-cheese laminate disclosed herein. Typically the first and/or second outer cream-cheese layers are covered with thin, transparent plastic film, and these individually packaged layers are optionally disposed within sealable packaging. There is further provided a package comprising a plurality of individually packaged cream-cheese laminates as disclosed herein.

In a second aspect the present disclosure provides a method for the manufacture of the cream-cheese laminate disclosed herein, the method comprising providing a cream-cheese, and co-extruding the cream-cheese with a filling to produce a cream-cheese laminate.

The method of the present disclosure involves a number of steps. As will be appreciated, while these steps are intended to be sequential, there may be some overlap between the steps when the process is carried out in a continuous manner.

The first step of the method involves providing a cream-cheese. As explained above, cream-cheese is a well-known foodstuff, and may be manufactured by conventional methods Cream-cheese curds are well-known in the art and can be obtained from conventional cream-cheese manufacturing processes. Typically, a dairy food base (such as milk) is mixed with a fat source (such as cream) and followed by a pasteurization step. Fermentation can then be initiated either directly, by addition of acid such as lemon juice or citric acid, or indirectly, by adding a bacterial culture to inoculate the mix with, for example, lactic acid producing cultures. During the fermentation process, the milk becomes acidified to a point where the casein in the milk precipitates out. This coagulation produces curds, which eventually become the cream-cheese, and whey, which is the liquid portion that contains water, lactose and other proteins. A separation step is employed to at least partially remove the moisture from the curd portion.

The cream-cheese curds, together with any remaining whey, is cooked and/or homogenised to form a cream-cheese. It is well known to homogenise dairy compositions to ensure that the fat content is evenly distributed in the aqueous portion of the composition, preventing a cream layer from forming on the top of the composition. It is also common to include a step of sterilising or pasteurising the cream-cheese or its ingredients, or a step of adding additional ingredients or flavourings. An example of the manufacture of cream-cheeses is set out in EP 2269466.

In the context of the present disclosure, the cream-cheese provided in the first step has preferably been supplemented with milk protein concentrate and one or more stabilisers selected from the group consisting of gelatine, xanthan gum, carrageenan, locust bean gum, citrate and mixtures of two or more thereof. Milk protein concentrate is a standard commercial product. Preferably, the milk protein concentrate comprises whey protein concentrate and/or one or more caseinate salts. Preferably, the cream-cheese is supplemented with milk protein concentrate in an amount of from 2 to 10 wt %, more preferably from 3 to 8 wt %, still more preferably from 4 to 6 wt %, based on the weight of the cream-cheese. As explained above, it has been found that the addition of milk protein concentrate, in combination with one or more of the above stabilisers, helps to provide a firmer texture in the resulting cream-cheese that lends it to co-extrusion with a filling.

Preferably, the cream-cheese is supplemented with the one or more stabilisers in an amount of from 1 to 5 wt %, more preferably from 2 to 4 wt %, still more preferably from 2.5 to 3.5 wt % by weight of the cream-cheese.

A subsequent step of the method is to co-extruding the cream-cheese with a filling to produce a cream-cheese laminate. The preferred attributes of the cream-cheese laminate have been explained above. The cream-cheese is preferably supplied in a hot, molten state which means, for example, a temperature of 70° C. or above. For example, the cream-cheese may be extruded at a temperature of from 65 to 85° C., more preferably from 75 to 85° C. The filling may be extruded at a temperature of from 65 to 90° C., more preferably from 80 to 90° C. The co-extrusion is preferably carried out into packaging material, such as a thin, transparent plastic film.

Preferably, the method further comprises packaging the cream-cheese laminate. As noted above, the co-extrusion may be carried out into the packaging material. The packaging material may, for example, be supplied as a continuous web of transparent plastic film, which may be wrapped around the co-extrusion nozzle. A suitable apparatus for co-extruding the cream-cheese and the filling, separating the resulting strand and packaging the laminates that form is provided in WO 2010/102159.

The present disclosure will be described in relation to the following non-limiting figure. FIG. 1 shows a flow chart of steps involved in a process of the method disclosed herein.

Advantageously, the cream-cheese laminate according to the present invention does not adhere to the packaging or to a user's hands when unwrapped. This permits the ready use of the laminate without it falling apart when opened and is critical to the provision of this product based on cream cheese.

BRIEF DESCRIPTION OF THE DRAWINGS

The present disclosure will now be described in relation to the non-limiting Figures, in which.

DETAILED DESCRIPTION

Figure 2A:
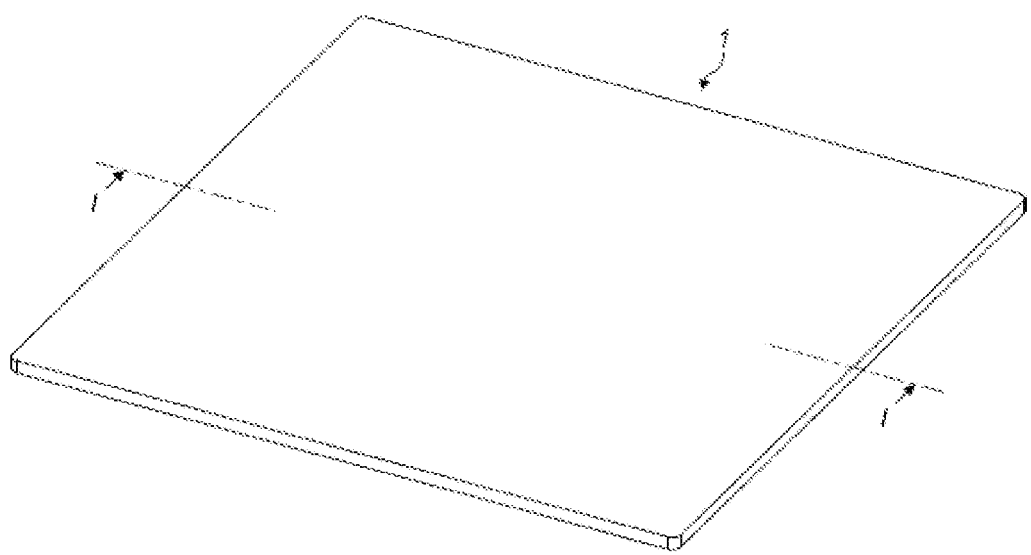
FIG. 2A shows a cream-cheese laminate as described herein.
Figure 2B:
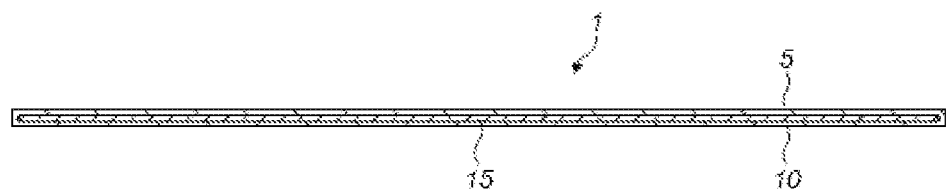
FIG. 2B shows a cross-section of the cream cheese laminate of FIG. 2A.

The cream-cheese laminate (1) of FIG. 2A is in the form of a flat sheet. The sheet has dimensions of approximately 8 cm square and 4 mm thick. As shown in FIG. 2B, the laminate (1) has a first outer cream-cheese layer (5), a second outer cream-cheese layer (10), and a filling layer (15) interposed therebetween.

Figure 3:
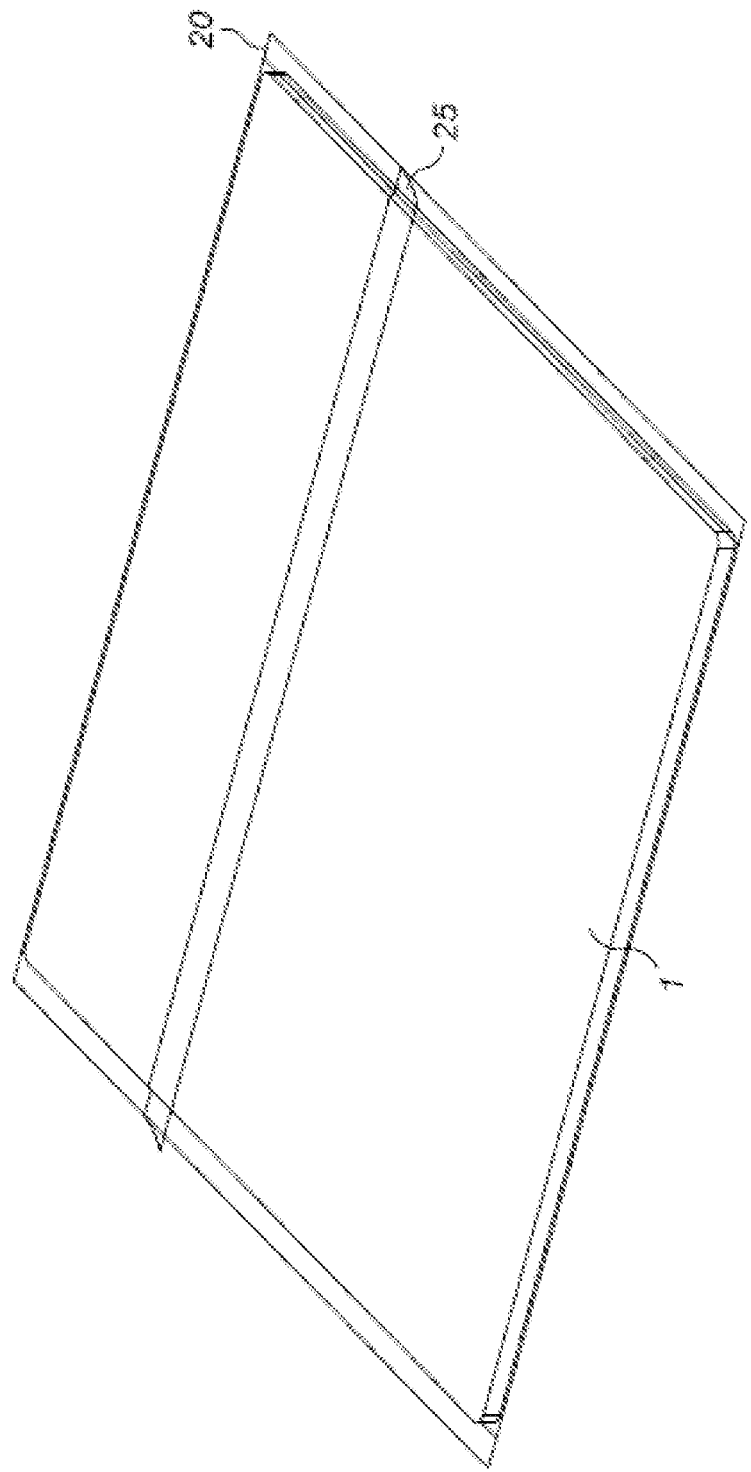
FIG. 3 shows an individually packaged cream-cheese laminate as described herein.

The individually packaged cream-cheese laminate (1) of FIG. 3 comprises a thin plastic packaging (20), provided with a liftable flap (25) for ready opening of the packaging (20). Such packaging is well known for cheese slices.

Figure 4A:
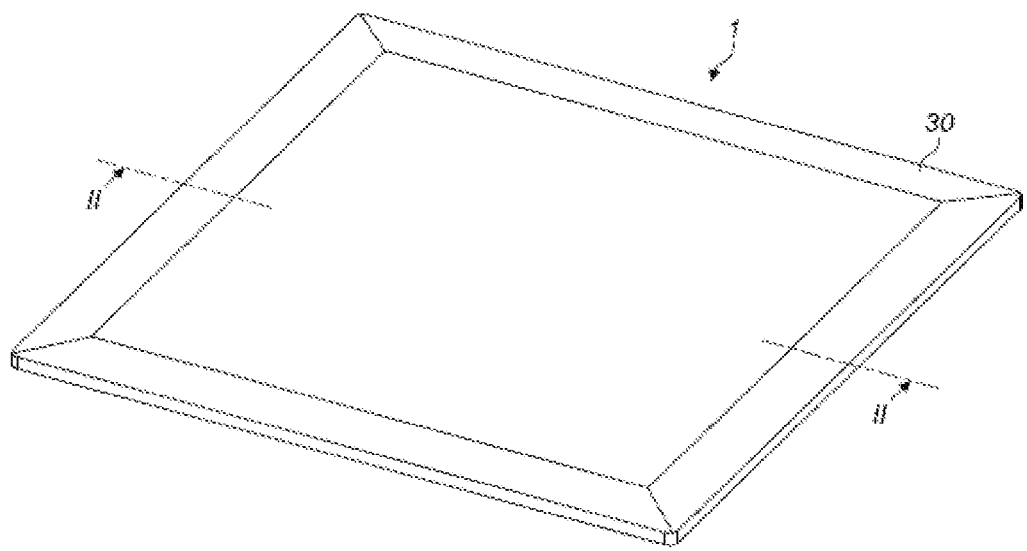
FIG. 4A shows a cream-cheese laminate as described herein.
Figure 4B:
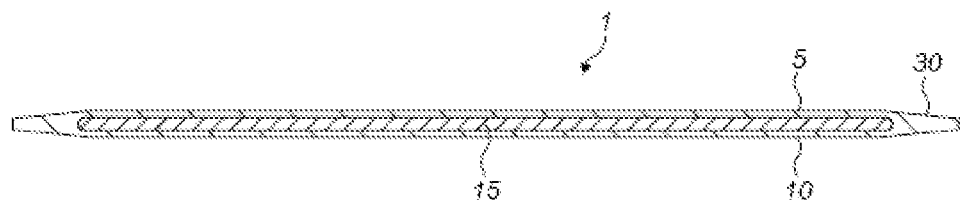
FIG. 4B shows a cross-section of the cream cheese laminate of FIG. 4A.

The cream-cheese laminate (1) of FIG. 4A is in the form of a sheet where the first and second cream-cheese layers (5, 10) are merged to form a single layer (30) around the periphery of the laminate (1), wherein the thickness of said single layer (30) is less than the thickness of a middle of the laminate (1). The sheet has dimensions of approximately 8 cm square and 4 mm thick in the middle, tapering to 2 mm thick at the periphery. As shown in FIG. 4B, the laminate (1) has a first outer cream-cheese layer (5), a second outer cream-cheese layer (10), and a filling layer (15) interposed therebetween.

The present disclosure will now be described in relation to the following non-limiting examples.

Example 1

Figure 1:
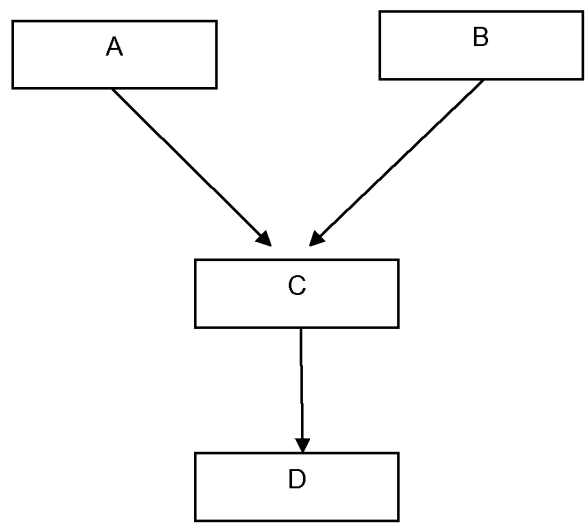
FIG. 1 shows a flow chart of the method steps according to the method disclosed herein.

A cream-cheese laminate having a filling of a second cream-cheese was produced in accordance with the steps shown in FIG. 1, namely:

A—Mixing and cooking the ingredients for the outer layers and the filling

B—Pumping the hot outer layers and the hot filling into a co-extruding nozzle

C—Co-extruding the outer layers and filling into innerwrap film

D—Cooling the filled cream-cheese product

Stephan cookers (direct heating) were used to cook the cream-cheese for the outer layers and a FRIMA cooker (direct heating) was used to cook the cream-cheese filling. The product was filled into innerwrap film with a Natec Free Pack machine and cooled down and stored refrigerated.

In relation to the pumping stage, it was found that the viscosity of the outer layers of cream-cheese was higher than that of a standard processed cheese but less elastic and therefore no pumping issues were encountered.

The cream-cheese filling was coloured with paprika extract so that the three layers could be clearly identified.

The final product was acceptable from a sensory and texture perspective and did not stick to the packaging film when removing it.

The ingredients for the outer layers and the filling are given below.

Outer Layer Recipe:

| Ingredient | % |
| --- | --- |
| Fresh cheese (high solids) | 56.47 |
| Philadelphia ® (bucket recipe) | 26.06 |
| Water/condensate | 9.82 |
| Gobulal 70 A (whey protein concentrate) | 4.00 |

-continued

| Ingredient | % |
| --- | --- |
| Gelatine | 1.10 |
| Carrageenan (stabiliser) | 0.70 |
| Salt | 0.70 |
| Tri-sodium citrate (stabiliser) | 0.30 |
| Xanthan (stabiliser) | 0.25 |
| Lactic acid (acidifier) | 0.40 |
| Citric acid (acidifier) | 0.20 |
| Locust bean gum (stabiliser) | 0.20 |

Filling Recipe:

| Ingredient | % |
| --- | --- |
| Philadelphia (bucket recipe) | 72.62 |
| Butter | 11.79 |
| Water/condensate | 9.48 |
| Milk protein concentrate | 5.00 |
| Tri-sodium citrate (stabiliser) | 0.80 |
| Salt | 0.16 |
| Citric Acid (acidifier) | 0.16 |
| Oleoresine Paprika 100,000 c.u. (colour) | 0.02 |

Example 2

A cream-cheese laminate having a filling of a second cream-cheese was produced following the same procedure as Example 1.

Outer Layer Recipe

| Ingredient | % |
| --- | --- |
| Fresh cheese (high solids) | 45.00 |
| Philadelphia ® (bucket recipe) | 18.27 |
| Mozzarella | 15.00 |
| Water/condensate | 10.72 |
| Ca-Caseinate (ALAN. 380) | 5.71 |
| Gelatine | 2.00 |
| Salt | 0.80 |
| Tri-sodium citrate (stabiliser) | 2.00 |
| Lactic acid (acidifier) | 0.50 |

The filling recipe was the same as that used in Example 1.

Testing

| Trial code | Stabiliser | stabiliser amount [g/100 g] | solid content [g/100 g] | protein content [g/100 g] | Sticking to packing film * | Sticking to fingers * |
| --- | --- | --- | --- | --- | --- | --- |
| Example 1 (above) | Gelatine, carrageenan, xanthan, citrate, locust bean gum | 2.6 | 46.2 | 9.6 | 5 | 5 |
| Example 2 (above) | Gelatine, citrate, | 4.0 | 48 | 15.2 | 5 | 5 |
| Comparative 1 | Citrate | 0.8 | 46 | 9.5 | 3 | 2 |
| Example 3 | Gelatine, citrate, locust bean gum, xanthan | 4.7 | 42 | 11.2 | 5 | 5 |
| Comparative 2 | Carrageenan, locust bean gum | 0.3 | 34.4 | 5.8 | 1 | 1 |

-continued

| Trial code | Stabiliser | stabiliser amount [g/100 g] | solid content [g/100 g] | protein content [g/100 g] | Sticking to packing film * | Sticking to fingers * |
|---|---|---|---|---|---|---|
| Comparative 3 | none | 0 | 41.7 | 7.5 | 2 | 1 |
| Comparative 4 | Carrageenan, locust bean gum | 0.5 | 27.5 | 8.3 | 3 | 1 |
| Comparative 5 | Locust bean Gum | 0.2 | 43.00 | 5.3 | 2 | 1 |

In the above table, 1 is very sticky, through to 5 which does not stick.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. An individually packaged, extruded cream-cheese laminate in the form of a flat sheet comprising
   first and second outer cream-cheese layers and a filling layer interposed therebetween,
   wherein a middle of the flat sheet has a thickness of 6 mm or less,
   wherein the filling layer is of a constant thickness, wherein said thickness is 4 mm or less,
   wherein the first and second outer cream-cheese layers consist of a cream cheese,
   wherein the cream-cheese comprises one or more stabilisers selected from the group consisting of gelatine, xanthan gum, carrageenan, locust bean gum, citrate, and mixtures of two or more thereof,
   wherein the stabilisers are present in an amount of from 1 to 5 wt % by weight of the cream-cheese, and
   wherein the cream-cheese has a solids content of from 35 to 60 wt % and
   a protein content of from 6 to 20 wt % based on the weight of the cream-cheese.

2. The cream-cheese laminate according to claim 1, wherein the filling layer comprises a cheese having a different fat content and/or protein content to the cream-cheese in the outer layers, processed cheese, pesto, tomato sauce, salad cream, mayonnaise, mustard, marmalade, jam, jelly, chocolate, Marmite®, or a mixture of two or more thereof.

3. The cream-cheese laminate according to claim 1, having a mass of 45 g or less.

4. The cream-cheese laminate according to claim 1, wherein the filling layer is fully enclosed by the first and second outer cream-cheese layers.

5. A package comprising a plurality of the individually packaged cream-cheese laminates of claim 1.

6. A method for the manufacture of an individually packaged, extruded cream-cheese laminate in the form of a flat sheet, the method comprising:
   providing a cream-cheese, and co-extruding the cream-cheese with a filling to produce a cream-cheese laminate comprising:
   first and second outer cream-cheese layers and a filling layer interposed there between,
   wherein a middle of the flat sheet has a thickness of 6 mm or less,
   wherein the filling layer is of a constant thickness, wherein said thickness is 4 mm or less,
   wherein the first and second outer cream-cheese layers consist of a cream cheese,
   wherein the cream-cheese comprises one or more stabilisers selected from the group consisting of gelatine, xanthan gum, carrageenan, locust bean gum, citrate, and mixtures of two or more thereof,
   wherein the stabilisers are present in an amount of from 1 to 5 wt % by weight of the cream cheese, and
   wherein the cream-cheese has a solids content of from 35 to 60 wt % and a protein content of from 6 to 20 wt % based on the weight of the cream-cheese.

7. The method according to claim 6, wherein the step of coextruding is conducted at a temperature of 70° C. or above.

8. The method according to claim 6, wherein the step of coextruding is conducted directly onto the packaging material to package the cream-cheese laminate.

9. The method according to claim 6, wherein the cream cheese has been supplemented with milk protein concentrate.

10. The method according to claim 6, wherein the cream-cheese is supplemented with milk protein concentrate in an amount of from 2 to 10 wt % based on the weight of the cream-cheese.

11. The cream-cheese laminate according to claim 1, wherein the stabilisers are present in an amount of from 2 to 4 wt % by weight of the cream-cheese.

12. The cream-cheese laminate according to claim 11, wherein the stabilisers are present in an amount of from 2.5 to 3.5 wt % by weight of the cream-cheese.

* * * * *